3,141,686
PIPE COUPLING
Telford L. Smith, South San Francisco, and Thomas A. Graham, San Mateo, Calif., assignors to Smith-Blair, Inc., San Francisco, Calif., a corporation of California
Filed Nov. 24, 1958, Ser. No. 776,025
2 Claims. (Cl. 285—174)

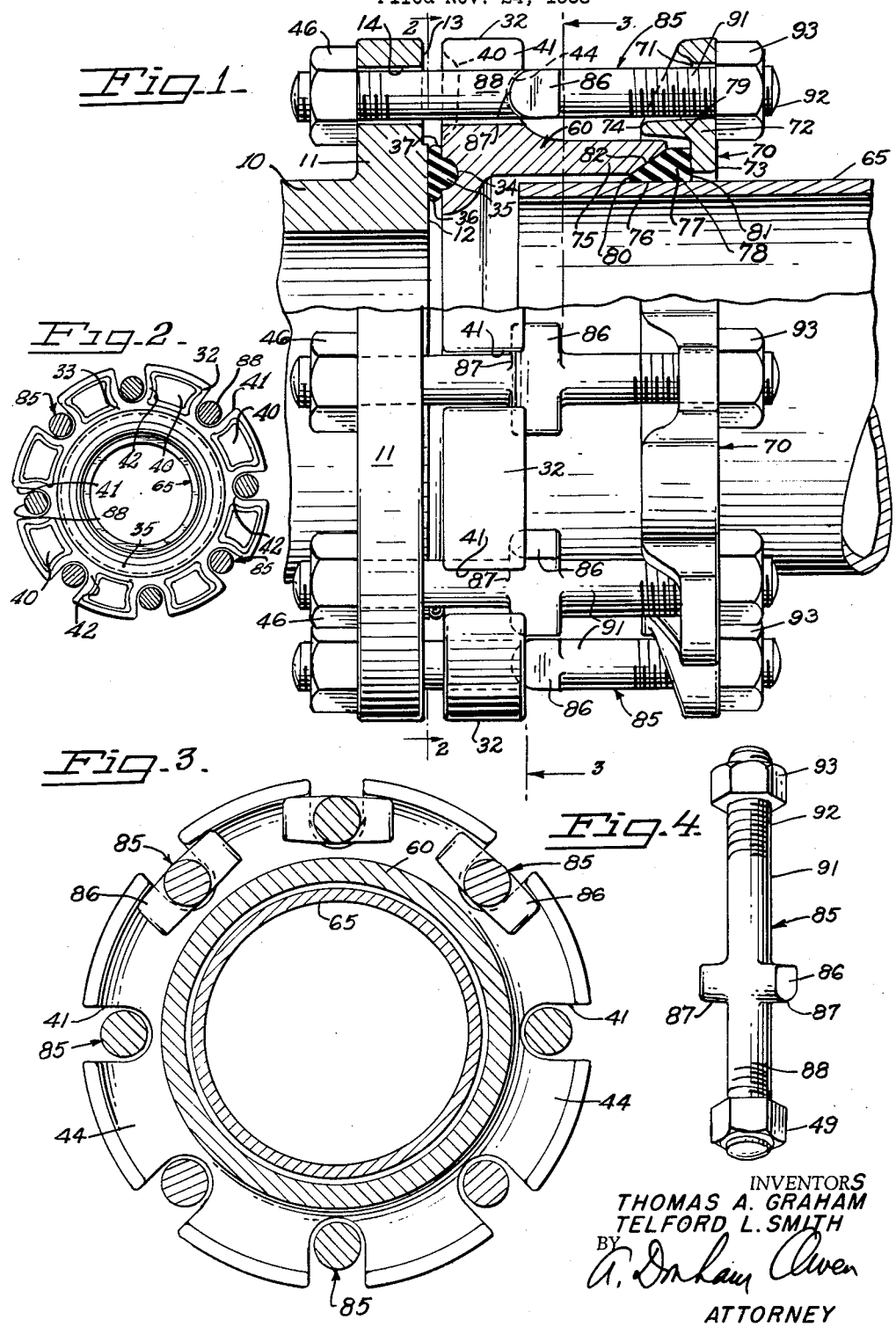

This invention relates to improvements in pipe couplings. More particularly, it relates to what is known as a flanged coupling adapter.

Flexible flange coupling adapters are normally used to secure plain-end pipe to machined flanges. The flanges referred to have carefully machined surfaces, and in the past the coupling has been done by mating thereagainst another carefully machined surface, the seal being accomplished through the use of a flat gasket, placed between said flanges. However, such carefully machined surfaces are expensive to manufacture whereas the proposed adapters, utilizing an elastomeric O ring, eliminate the necessity for machining adapter flange faces.

An important object of the present invention is to provide a relatively inexpensive fitting which will maintain a seal with the well-known flange type of fitting without having to be machined. A corollary object is the substitution of inexpensive cast fittings for carefully machined flange adapters.

Another object of the invention is to provide a relatively lightweight flange adapter.

Another object of the invention is to provide a novel and improved sealing arrangement for use in coupling plain-end pipe to flanged fittings.

While inexpensive and light in weight, the product of this invention is by no means inferior in its sealing qualities to the flange adapters heretofore used. In fact, for many uses the seal produced at the coupling joint is actually superior to what has been used heretofore. Moreover, the attachment of the fittings of this invention to the flanges can often be made in much less time than was required with the adapters heretofore in use.

Other objects and advantages of the invention will appear from the following description of some preferred embodiments thereof.

In the drawings:

FIG. 1 is a view in side elevation and partly in section of a flanged fitting to which a plain-end metal pipe is coupled by an adapter embodying the principles of the present invention.

FIG. 2 is a fragmentary view in section taken along the line 2—2 in FIG. 1 and showing half of the coupling member of the invention in end elevation.

FIG. 3 is a view in section taken along the line 3—3 in FIG. 1.

FIG. 4 is a view in elevation of one of the cross bolts.

Flanged fittings are well known in the art and need not be described in great detail. Some of these fittings (e.g., T's) have a plurality of machined flanges, and some of them have only one flange. In the form of the invention as shown in FIG. 1 a fragment of a machined-flanged fitting 10 is shown. Its flange 11 may have a carefully machined surface 12, according to the practice in the art. The flange 11 extends out radially beyond the surface 12, its outer radial surface 13 may be stepped back. Faces 12 and 13 are usually both machined and may be in the same plane or stepped as shown in FIG. 1. Also, bolt-receiving openings 14 are spaced at intervals around this outer portion and always radially outside the carefully machined surface 12.

In the present invention a novel type of flanged coupler adapter 60 is used. The adapter 30 includes a radial end flange 32. However, in order to save the expense of carefully machining the radial end 33 opposite the machined surfaces 12 and 13, the present invention utilized a simple casting and provides in that casting an annular recess 34, which lies opposite the machined surface 12. In the recess 34, which is preferably of semicircular cross section, is placed an elastomeric O-ring 35 which, before it is compressed, may be circular in cross section. However, upon compression relative to the flange 11, the O-ring 35 is squeezed very tightly, and the elastomer flows out into portions 36 and 37, as shown.

Lightness in weight is another feature of the present invention. For this purpose, the flange 32 has recessed outer portions 40. These portions 40 perform no function so far as the sealing is concerned but provide sufficient bulk and strength to support the bolts by which the adapter 60 is tightened to the flange 11. For this purpose open slots 41 extend in from the periphery, each terminating in semicircular seat portions 42 opposite and generally in line with the bolt openings 14 of the flange 11.

On the rear face 43 of the flange 32, an annular recess 44 is formed, with a semicircular cross section. This enables the use of cross-bolts 85, each to take the place of two bolts. Each cross bolt 85 (see FIG. 4) has a cross member 86 with a curved inner surface or portion 87, which is preferably semicircular in cross section to fit into the recesses 44. In any event, the recesses 44 and the cross member 86 are mated, so that when a bolt 85 is inserted in the slot, the T 46 locks in behind the rear face 43 and is held firmly in place against turning about its own axis yet permitting the bolt to rock slightly in flexibly compensating for any misalignment of parts. This eliminates the necessity for using studs or ordinary bolts and having to hold them with a wrench because the head will be held by the coupling itself. The use of the cross-bolt 85 makes it possible to provide a greater inner diameter for the sleeve, thereby giving the adapter an ability to receive a wide range of pipe sizes. The bolt 85 has a normal shank 88 with the outer end threaded for attachment of a suitable nut 49. As shown in FIG. 1, the shank 48 extends right through the opening 14, and the nut 49 is then attached against the flange 11. Upon drawing up the nut 14, the adapter 30 is brought toward the flange 11, and the O-ring 35 is compressed into a fully sealing position. It does not matter that the flange face 12 may have worn, become rusty, or otherwise suffers from faults, because the compression of the O-ring 35 can seal without the necessity for a finely machined surface.

A follower 70 is used, having a series of bolt openings 71 and also having an annular portion 72, T-shaped in cross section. The portion 72 has a radially inwardly extending rim 73 and an axially extending cylindrical portion 74. Also, the adapter 60 has an ordinary sleeve-like portion 75, at the outer end of which is a beveled face 76 which flares radially and axially outwardly. Between the radial rim 73 of the follower 70 and the face 76 is compressed a gasket 77.

The gasket 77 is preferably shaped with an axially extending inner periphery 78, an axially extending outer periphery 79, radial end faces 80 and 81 and a sloping portion 82 connecting one of the radial faces 80 with the outer axially extending periphery 79 and adapted to mate against the face 76. Under compression between the sloped face 76 and the radial face 73, the gasket 77 is compressed tightly radially inwardly against the wall of the pipe 65 and provides a very tight seal.

The cross bolt also has a shank 91 extending in the opposite direction from the shank 88, and this shank 91 extends through the bolt opening 71 of the follower 70 and has an outwardly threaded end 92 on which a nut 93 is threaded for tightening it against the follower 70. Thus, in this instance the single bolt 85 serves for both tightening the adapter 60 against the flange 11 and for tightening the follower 70 against the adapter 60. Thus it serves to tighten, though with separate nuts, both the O-ring 35 and the gasket 77. The adapter 60 may use both cross bolts 85 and T bolts. The number of bolt holes 14 in flange 11 is determined by accepted standards for flanged fittings, whereas a lesser number of bolts may be required to compress the gasket 77 with the follower 70.

Thus, the adapter 60 eliminates the necessity for having a machined adapter. The recessed hollows 40 reduce the weight with resultant savings on manufacturing and shipping costs. The O-ring seal 35 gives a hydrostatic as well as a mechanic seal, which is highly superior. The cross bolts 85 give much easier and more rapid installation, since the recess 44 holds them in firmly, and the length of the bolts 85 themselves is reduced, giving a further saving in metal and in weight due to the efficiency of the cross structure and to the fact that wrenches do not need to be used to hold them during tightening.

To those skilled in the art to which this invention relates, many changes in construction and widely differing embodiments and applications of the invention will suggest themselves without departing from the spirit and scope of the invention. The disclosures and description herein are purely illustrative and are not intended to be in any sense limiting.

We claim:

1. A flexible flange coupling adapter for connecting an unflanged cylindrical pipe end section to a pipe fitting having at its end an integral annular flange with a machined face, a radially outer annular portion having bolt openings therethrough, and a bearing face on the opposite side of said flange from said machined face, said flange adapter comprising a tubular metal casting having a sleeve portion with an inner periphery greater than the outer periphery of said cylindrical pipe end section to freely receive same and a radially extending annular flange portion at one end of said sleeve portion, said last mentioned flange portion having an end face opposing said machined face, with an annular O-ring-receiving groove therein and a radially outer portion with a series of peripherally open radially inwardly extending bolt-receiving slots with a series of axial recesses in between said slots, each slot being adapted for alignment with said bolt opening, and a rear face with an annular axial recess therein; a series of bolts, one at each slot, each having a transverse bar seated in said recess and locked thereby against rotation, said bolts being adapted to extend through the openings in said fitting; an elastomeric O-ring in said groove for engaging said flange face; a nut for each said bolt for compressing said O-ring between said machined face and said end face and thereby sealing said flange adapter to said flange; and means for connecting said sleeve to a said unflanged pipe, said means including an annular elastomeric ring compressed between the outer periphery of said pipe and the inner periphery of said sleeve; a follower facing the end of said sleeve opposite said flange, said follower having bolt openings therethrough aligned with said slots, said annular elastomeric ring comprising a gasket between said follower and said sleeve end, shank extension portions of said bolts extending from said bar and through the bolt openings of said follower; and nuts on said extension portions bearing against said follower and urging it against said sleeve to compress said gasket, for coupling said sleeve to cylindrical pipe.

2. The coupling of claim 1 wherein said sleeve portion has a conical seat flared radially and axially outwardly, said gasket having a face matching said seat, and wherein said follower has a radial face and an axial flange around a radial face and axial portion of said gasket.

References Cited in the file of this patent

UNITED STATES PATENTS

| | | |
|---|---|---|
| 264,965 | Shook | Sept. 26, 1882 |
| 282,967 | Duffy | Aug. 14, 1883 |
| 639,198 | McDonald | Dec. 12, 1899 |
| 696,603 | Smith | Apr. 1, 1902 |
| 931,914 | Connor | Aug. 24, 1909 |
| 1,020,839 | Neisen et al. | Mar. 19, 1912 |
| 1,366,955 | Schneible | Feb. 1, 1921 |
| 1,447,192 | Watson | Mar. 6, 1923 |
| 1,866,619 | Carson | July 12, 1932 |
| 1,988,694 | Mallay | Jan. 22, 1935 |
| 2,146,641 | McWane | Feb. 7, 1939 |
| 2,157,008 | Owen | May 2, 1939 |
| 2,225,750 | Martin | Dec. 24, 1940 |
| 2,701,871 | Rauch | Feb. 8, 1955 |
| 2,879,084 | Staiger | Mar. 24, 1959 |
| 2,887,446 | Marx | May 19, 1959 |

FOREIGN PATENTS

| | | |
|---|---|---|
| 1,785 | Great Britain | Jan. 22, 1897 |